US012353094B2

(12) United States Patent
Wang et al.

(10) Patent No.: US 12,353,094 B2
(45) Date of Patent: Jul. 8, 2025

(54) DISPLAY MODULE AND MIDDLE FRAME

(71) Applicants: BEIJING BOE DISPLAY TECHNOLOGY CO., LTD., Beijing (CN); BOE TECHNOLOGY GROUP CO., LTD., Beijing (CN)

(72) Inventors: Bochang Wang, Beijing (CN); Shanlei Hou, Beijing (CN); Haijun Shi, Beijing (CN); Zhaoshou Tian, Beijing (CN); Xiaodi Sun, Beijing (CN); Hui Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/263,619

(22) PCT Filed: Oct. 29, 2021

(86) PCT No.: PCT/CN2021/127632
§ 371 (c)(1),
(2) Date: Jul. 31, 2023

(87) PCT Pub. No.: WO2023/070578
PCT Pub. Date: May 4, 2023

(65) Prior Publication Data
US 2024/0085738 A1    Mar. 14, 2024

(51) Int. Cl.
*G02F 1/13357* (2006.01)
(52) U.S. Cl.
CPC .. *G02F 1/133608* (2013.01); *G02F 1/133603* (2013.01)

(58) Field of Classification Search
CPC ........ G02F 1/133608; G02F 1/133603; G02F 1/133317
See application file for complete search history.

(56) References Cited

U.S. PATENT DOCUMENTS 10,852,586 B2   12/2020  Li et al.
2015/0346541 A1* 12/2015  Ando ............... G02F 1/133308
                                              362/606
(Continued)

FOREIGN PATENT DOCUMENTS

CN    105066013 A    11/2015
CN    209690674 U    11/2019
(Continued)

*Primary Examiner* — Kevin Quarterman
(74) *Attorney, Agent, or Firm* — LEASON ELLIS LLP

(57) ABSTRACT

The embodiments of the present disclosure provide a display module and a middle frame, the display module includes a backlight module and a display panel, the backlight module includes a back plate, a first light source, a middle frame. The back plate includes a bottom plate, the first light source is on the bottom plate, the middle frame is between the bottom plate and the display panel. A side of the middle frame close to the display panel includes a first bearing portion and a second bearing portion, the first bearing portion is at an edge of the middle frame, a second light source is on the first bearing portion, the second bearing portion is on a side of the first bearing portion close to a display region of the display panel, the second bearing portion is connected to a position of the display panel corresponding to the display region.

19 Claims, 6 Drawing Sheets

(56) References Cited

U.S. PATENT DOCUMENTS

| | | | | |
|---|---|---|---|---|
| 2018/0074363 | A1* | 3/2018 | Matsumoto | G02F 1/13452 |
| 2019/0137829 | A1* | 5/2019 | Kim | G02F 1/133608 |
| 2021/0033914 | A1* | 2/2021 | Seo | G02F 1/133308 |
| 2022/0236604 | A1* | 7/2022 | Dong | G02F 1/133317 |

FOREIGN PATENT DOCUMENTS

| | | |
|---|---|---|
| CN | 209880030 U | 12/2019 |
| CN | 209946590 U | 1/2020 |
| CN | 111179745 A | 5/2020 |
| CN | 111880337 A | 11/2020 |
| CN | 212623458 U | 2/2021 |
| CN | 113064302 A | 7/2021 |

* cited by examiner

30

DISPLAY MODULE AND MIDDLE FRAME

CROSS-REFERENCE TO RELATED PATENT APPLICATIONS

This application is a U.S. National Stage Application under 35 U.S.C. § 371 of International Patent Application No. PCT/CN2021/127632, filed Oct. 29, 2021, which is incorporated by reference in its entirety. The International Application was published on May 4, 2023, as Publication No. WO/2023/070578.

TECHNICAL FIELD

At least one embodiment of the present disclosure relates to a display module and a middle frame.

BACKGROUND

Large-sized display devices, such as outdoor display screens, have been widely used in various video control centers, outdoor advertising and other fields. Due to the small size of a single display device, the outdoor display screen is generally arranged by a plurality of relatively small-sized display units that cooperate to display an overall picture, and the outdoor display screen has become the current trend of display because the borderless display or narrow frame display can provide users with a more shocking visual experience.

However, each of the display units includes a frame, and the width of the frame of each of the display units will directly affect the width of a splicing seam of a splicing screen formed after splicing, thereby affecting the brightness at the splicing seam of the splicing screen, resulting in the picture displayed on the entire outdoor display screen being divided by the frame, resulting in discontinuous picture display, and further affecting the overall display effect of the splicing screen. Therefore, the splicing screen requires higher brightness of the frame.

SUMMARY

At least one embodiment of the present disclosure provides a display module and a middle frame, in the display module, the middle frame is provided with a first bearing portion and a second bearing portion on a side close to the display panel, the first bearing portion is disposed at the edge of the middle frame, the second light source is disposed on the first bearing portion, and the second bearing portion is on a side of the first bearing portion close to the display region of the display panel, and the second bearing portion is connected to the position of the display panel corresponding to the display region, so as to solve the problem that the edge pixel picture of the narrow frame splicing screen is darkened due to the poor transmittance of the adhesive and the assembly process error, thereby improving the brightness of the edge pixels of the display module.

At least one embodiment of the present disclosure provides a display module, and the display module comprises a backlight module and a display panel, in which the backlight module comprises: a back plate, comprising a bottom plate; a first light source, disposed on the bottom plate; and a middle frame, disposed between the bottom plate and the display panel, and a side of the middle frame close to the display panel comprises a first bearing portion and a second bearing portion, the first bearing portion is at an edge of the middle frame, and a second light source is disposed on the first bearing portion; and the second bearing portion is on a side of the first bearing portion close to a display region of the display panel, and the second bearing portion is connected to a position of the display panel corresponding to the display region.

For example, the display module provided by at least one embodiment of the present disclosure, further comprises a light board disposed on the first bearing portion, in which the second light source comprises a plurality of light-emitting diodes disposed on the light board.

For example, in the display module provided by at least one embodiment of the present disclosure, in a direction from the display region to a non-display region, at least two light-emitting diodes are disposed on the light board.

For example, the display module provided by at least one embodiment of the present disclosure, further comprises a light guide plate disposed on the first bearing portion, and the second light source comprises a light bar disposed on a side wall of the first bearing portion.

For example, in the display module provided by at least one embodiment of the present disclosure, a width of the second bearing portion is smaller than a width of the first bearing portion.

For example, in the display module provided by at least one embodiment of the present disclosure, the width of the second bearing portion is 1%~10% of the width of the first bearing portion.

For example, in the display module provided by at least one embodiment of the present disclosure, the middle frame comprises an arc-shaped portion protruding toward the first light source, an accommodating space between the arc-shaped portion and a side plate of the back plate as well as the bottom plate of the back plate, and a first supporting portion; the first supporting portion is disposed in the accommodating space, and the first supporting portion is in an "L" shape; and a first end of the first supporting portion is connected to a surface of the first bearing portion close to the bottom plate, and a second end of the first supporting portion is connected to a surface of the arc-shaped portion close to the side plate.

For example, in the display module provided by at least one embodiment of the present disclosure, a gap is formed between the first supporting portion and the side plate.

For example, in the display module provided by at least one embodiment of the present disclosure, the first supporting portion divides the accommodating space into a first sub-accommodating space and a second sub-accommodating space, and a volume of the first sub-accommodating space is smaller than a volume of the second sub-accommodating space.

For example, in the display module provided by at least one embodiment of the present disclosure, a signal line, a connector and a driving board are disposed in the first sub-accommodating space, a first end of the signal line is electrically connected to the second light source, a second end of the signal line is electrically connected to the driving board through the connector, and the driving board is configured to provide a turn-on voltage to the second light source.

For example, the display module provided by at least one embodiment of the present disclosure, further comprises a flexible circuit board, a supporting foam, and a flexible circuit protective board which are all disposed on a side of the side plate away from the second sub-accommodating space, and the flexible circuit board is connected to the display panel and configured to drive the display panel for display.

For example, in the display module provided by at least one embodiment of the present disclosure, an optical film layer is disposed on a surface of the arc-shaped portion close to the first light source, and the optical film layer is configured to guide light emitted by the first light source and irradiated on the optical film layer to the display panel.

For example, in the display module provided by at least one embodiment of the present disclosure, the middle frame further comprises a second supporting portion, the second supporting portion is in a shape of a long strip, a first end of the second supporting portion is connected to the first bearing portion, and a side wall of the second supporting portion is laminated to a side wall of the side plate.

For example, in the display module provided by at least one embodiment of the present disclosure, the display panel comprises a liquid crystal cell and a glass diffuser plate disposed on a side of the liquid crystal cell close to the backlight module, and the second bearing portion and the glass diffuser plate are laminated together by an adhesive.

For example, the display module provided by at least one embodiment of the present disclosure, further comprises a reflective film disposed on the bottom plate, and the reflective film is at least partially disposed between the bottom plate and a bottom surface of the middle frame, and the reflective film is in contact with both the bottom plate and the bottom surface of the middle frame.

For example, the display module provided by at least one embodiment of the present disclosure, further comprises a light-shielding tape, and the light-shielding tape is connected to a side surface of the display panel, a side surface of the first bearing portion, and a surface of the bottom plate away from the display panel.

For example, the display module provided by at least one embodiment of the present disclosure, further comprises a reflective layer disposed between the light-shielding tape and the second light source, and the reflective layer is laminated to the light-shielding tape.

For example, the display module provided by at least one embodiment of the present disclosure, further comprises a glass plate disposed on a side of the display panel away from the backlight module, and an edge of the glass plate comprises an arc-shaped portion.

At least one embodiment of the present disclosure further provides a middle frame, and the middle frame comprises a first bearing portion and an arc-shaped portion connected to an end portion of the first bearing portion, in which the arc-shaped portion protrudes toward a side away from the first bearing portion, and a second bearing portion is disposed on an end portion of a side of the arc-shaped portion; and a first supporting portion is disposed between the first bearing portion and the arc-shaped portion, a first end of the first supporting portion is connected to a surface of the first bearing portion opposite to a bearing surface, and a second end of the first supporting portion is connected to a surface of the arc-shaped portion to form a first sub-accommodating space.

For example, in the middle frame provided by at least one embodiment of the present disclosure, the first supporting portion is in an "L" shape.

For example, in the middle frame provided by at least one embodiment of the present disclosure, a second supporting portion is disposed on a side of the first sub-accommodating space away from the arc-shaped portion, the second supporting portion is in a shape of a long strip, and a first end of the second supporting portion is connected to the first bearing portion.

At least one embodiment of the present disclosure further provides a display module, and the display module comprises a backlight module and a display panel, in which the backlight module comprises: a back plate, a first light source and a middle frame, the back plate comprises a bottom plate, the first light source is disposed on the bottom plate, the middle frame is disposed between the bottom plate and the display panel, and a side of the middle frame close to the display panel comprises a first bearing portion and a second bearing portion, the first bearing portion is at a display region of the middle frame, and a second light source is disposed on the first bearing portion; and the second bearing portion is on a side of the first bearing portion close to a peripheral region of the display panel, and the second bearing portion is connected to a position corresponding to the edge of the display panel.

For example, in the display module provided by at least one embodiment of the present disclosure, a width of the second bearing portion is smaller than a width of the first bearing portion.

BRIEF DESCRIPTION OF THE DRAWINGS

In order to clearly illustrate the technical solutions of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1:
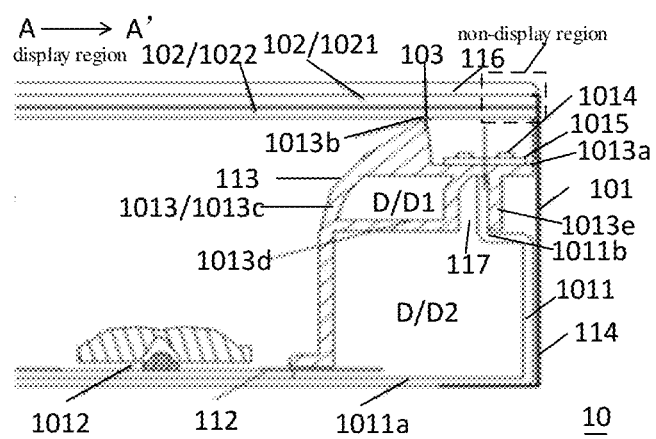
FIG. 1 is a schematic diagram of a cross-sectional structure of a display module provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical terms and scientific terms used herein have the same meanings as commonly understood by one of ordinary skilled in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or a mechanical connection, but may include an electrical connection, directly or indirectly. "On," "under," "right," "left" and the like are only used to indicate relative position relationship, and when the position of the object which is described is changed, the relative position relationship may be changed accordingly.

In the field of large-screen display, because the production cost of a super-large-sized display screen of more than 100 inches is much higher than, for example, the production cost of a large-sized display screen of 55 inches, and due to the limitation of the manufacturing process and the equipment that can be used at present, the current largest-sized display screen is generally able to achieve 110 inches. Therefore, the large screen is formed by splicing a plurality of screens and is used to display image, which has been widely used.

The liquid crystal splicing screen has the characteristics of high brightness, high color saturation and high contrast. However, because the liquid crystal in the liquid crystal display panel is fluid, a frame sealant needs to be used to seal the liquid crystal in a specific region, and the frame sealant cannot be used for display. In addition, in the glass cutting process, a certain distance needs to be reserved for the grinding of the panel to ensure that the pixel region can be displayed normally, which results in a "splicing seam" that cannot be completely eliminated when the spliced liquid crystal display panel is displayed. Small-pitch Mini LEDs or Micro LEDs reduce the resolution of LEDs displayed at splicing seam, but show high advantages in contrast and brightness. With the continuous reduction of the process cost of small-pitch light-emitting diode display technology, and in the face of increasingly fierce competition pressure, researchers in the LCD panel-related industry have continued to upgrade and optimize in terms of technology, structure, optics, etc., and have achieved a leap in the width of the splicing seam of the splicing screen from "3.Xmm" to "1.Xmm" to "0.Xmm", but the reduction of the visual width of the "splicing seam" and the optimization of its surrounding pictures are still the key technical points of the current splicing screen display.

At present, a backlight module in a narrow-frame liquid crystal splicing screen is laminated to a display panel by applying adhesive on the edge. Considering test requirements of the adhesive force and product reliability, the effective laminating width of the adhesive is about 1 mm, and the theoretical optical transmittance of the used adhesive is between 73% and 85%. Therefore, the picture of the final product tends to appear dark in the edge glued region, and the closer to the edge, the darker the brightness. In addition, due to the influence of the processing and assembly process, as well as the working process of the adhesive coating and laminating equipment, the problem of uneven brightness in the dark region will occur, and after the end product is spliced, the superposition of the defect will affect the overall visual effect of the display module. By optimizing the light reflection angle on the inner surface of the backlight module, reducing the width of the adhesive bearing surface, designing the light-emitting diodes with non-equidistant spacing, and using transparent materials instead of non-transparent materials, the phenomenon of poor dark frame can be reduced in positive viewing angles. However, none of the above-mentioned methods can fundamentally eliminate the phenomenon of poor dark frame in squint viewing angles. On the other hand, the seamless display products developed on the basis of extremely narrow splicing seam products use 2.5D glass (the 2.5D glass is obtained by making the edges of normal glass curved) to refract the light emitted by the backlight to achieve the effect of magnifying the image, but the actual edge pixel brightness is uneven due to the above reasons, and the effect of seamless display using the 2.5D glass is difficult to improve.

The inventor(s) of the present disclosure has noticed that the brightness problem caused by the uneven darkening of the edge pixels of the display module will visually aggravate the problem of splicing seams in the splicing screen. By changing the structure of the middle frame included in the backlight module, the brightness and uniformity of the edge pixels can be improved, and with the refraction effect of the 2.5D glass, a nearly seamless display effect can be achieved.

At least one embodiment of the present disclosure provides a display module, the display module includes a backlight module and a display panel, and the backlight module includes a back plate, a first light source, and a middle frame. The back plate includes a bottom plate, the first light source is disposed on the bottom plate, and the middle frame is disposed between the bottom plate and the display panel. A side of the middle frame close to the display panel includes a first bearing portion and a second bearing portion, the first bearing portion is at an edge of the middle frame, and a second light source is disposed on the first bearing portion. The second bearing portion is on a side of the first bearing portion close to a display region of the display panel, and the second bearing portion is connected to a position of the display panel corresponding to the display region. The display module has a simple structure, low cost, and can avoid the phenomenon of poor dark frame.

For example, FIG. 1 is a schematic diagram of a cross-sectional structure of a display module provided by at least one embodiment of the present disclosure. As shown in FIG. 1, the display module 10 includes a backlight module 101 and a display panel 102, and the backlight module 101 includes a back plate 1011, a first light source 1012 and a middle frame 1013. The back plate 1011 includes a bottom plate 1011a, the first light source 1012 is disposed on the bottom plate 1011a, and the middle frame 1013 is disposed between the bottom plate 1011a and the display panel 102. A side of the middle frame 1013 close to the display panel 102 includes a first bearing portion 1013a and a second bearing portion 1013b, the first bearing portion 1013a is at an edge of the middle frame 1013, and a second light source 1014 is disposed on the first bearing portion 1013a. The second bearing portion 1013b is on a side of the first bearing portion 1013a close to a display region of the display panel 102, and the second bearing portion 1013b is connected to a position of the display panel 102 corresponding to the display region. The position where the middle frame 1013 is connected to the display panel 102 is disposed in the display region, and at least two second light sources 1014 are disposed in a non-display region, which can reduce or eliminate the problem of the edge pixel picture being dark.

For example, both the surface of the first bearing portion 1013a and the surface of the second bearing portion 1013b are parallel to the surface of the display panel.

For example, although FIG. 1 shows that the cross-sectional shape of the gap between the first bearing portion 1013a and the display panel 102 is a rectangular notch, the cross-sectional shape of the gap between the first bearing portion 1013a and the display panel 102 may also be a non-rectangular structure, and may also be a circle, an ellipse, or the like, which are not limited in the embodiments of the present disclosure.

For example, as shown in FIG. 1, the display panel 102 and the backlight module 101 are bonded to the position of the second bearing portion 1013b by a first adhesive 103 for connection. Specifically, the surface of the middle frame 1013, which is included in the backlight module 101, close to the display panel 102 is bonded to the display panel 102 by the first adhesive 103. The first adhesive 103 may cover the entire second bearing portion 1013b, or may cover a part of the second bearing portion 1013b, which are not limited in the embodiments of the present disclosure.

For example, as shown in FIG. 1, the display module 10 further includes a light board 1015 disposed on the first bearing portion 1013 a, and the second light source 1014 includes a plurality of light-emitting diodes disposed on the light board 1015.

For example, as shown in FIG. 1, in the direction A-A' from the display region to the non-display region, at least two light-emitting diodes are disposed on the light board 1015. In an actual product, a plurality of light-emitting diodes are arranged in a full circle around the display panel 102.

For example, the non-display region is a frame region of the display panel, and in the direction A-A' from the display region to the non-display region, the size of the frame region is smaller than the width of the first bearing portion, and the width of the first bearing portion is half or ⅓ of the size of the frame region.

Figure 2:
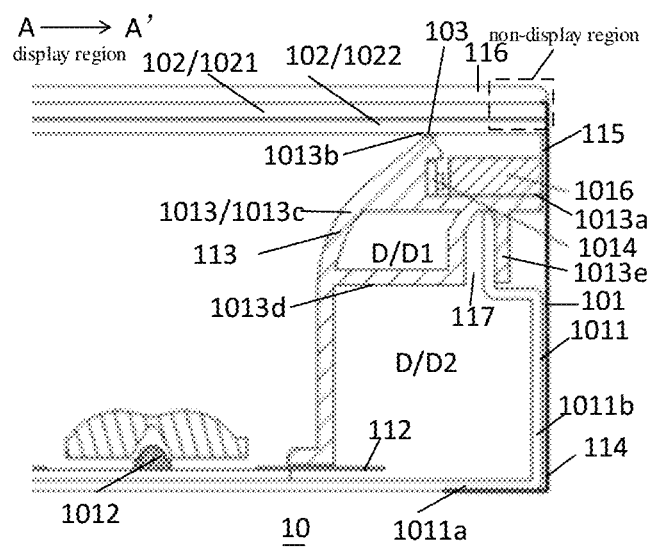
FIG. 2 is a schematic diagram of a cross-sectional structure of another display module provided by at least one embodiment of the present disclosure.

For example, FIG. 2 is a schematic diagram of a cross-sectional structure of another display module provided by at least one embodiment of the present disclosure. The difference between the display module 10 shown in FIG. 2 and the display module 10 shown in FIG. 1 is that in FIG. 2, the display module 10 includes a light guide plate 1016 disposed on the first bearing portion 1013a, and the second light source 1014 includes a light bar disposed on a side wall of the first bearing portion 1013a, that is, the second light source 1014 is not a structure in which a plurality of light-emitting diodes are arranged on the light board in FIG. 1. For example, in FIG. 2, the light bar is arranged in a full circle around the display panel 102.

For example, the light guide plate 1016 is a dot-type light guide plate, which can uniformly output the light emitted from the light bar.

For example, as shown in FIG. 1 and FIG. 2, in the display module 10, the width of the second bearing portion 1013b is smaller than the width of the first bearing portion 1013a, which can ensure that the area of the connection between the backlight module 101 and the display panel 102 is sufficiently small, and the region irradiated by the light emitted by the second light source 1014 disposed at the edge region is sufficiently large, so that the brightness of the edge position can be improved.

For example, as shown in FIG. 1 and FIG. 2, the width of the second bearing portion 1013b is 1% to 10% of the width of the first bearing portion 1013a. For example, the width of the second bearing portion 1013b is 1%, 2%, 4%, 6%, 8%, or 10% of the width of the first bearing portion 1013a.

It should be noted that the width of the first bearing portion 1013a and the width of the second bearing portion 1013b are respectively the widths in the direction A-A' from the display region to the non-display region in FIG. 1 or FIG. 2.

For example, as shown in FIG. 1 and FIG. 2, the middle frame 1013 includes an arc-shaped portion 1013c protruding toward the first light source 1012, an accommodating space D between the arc-shaped portion 1013c and a side plate 1011b of the back plate 1011 as well as the bottom plate 1011a of the back plate 1011, and a first supporting portion 1013d. The first supporting portion 1013d is disposed in the accommodating space D, and the first supporting portion 1013d is in an "L" shape. A first end of the first supporting portion 1013d is connected to a surface of the first bearing portion 1013a close to the bottom plate 1011a, and a second end of the first supporting portion 1013d is connected to a surface of the arc-shaped portion 1013c close to the side plate 1011b. It should be noted that, the first supporting portion 1013d may also have other shapes such as zigzag, which are not limited in the embodiments of the present disclosure.

For example, as shown in FIG. 1 and FIG. 2, a gap 117 is formed between the first supporting portion 1013d and the side plate 1011b.

For example, as shown in FIG. 1 and FIG. 2, the first supporting portion 1013d divides the accommodation space D into a first sub-accommodating space D1 and a second sub-accommodating space D2, and the volume of the first sub-accommodating space D1 is smaller than the volume of the second sub-accommodating space D2.

Figure 3:
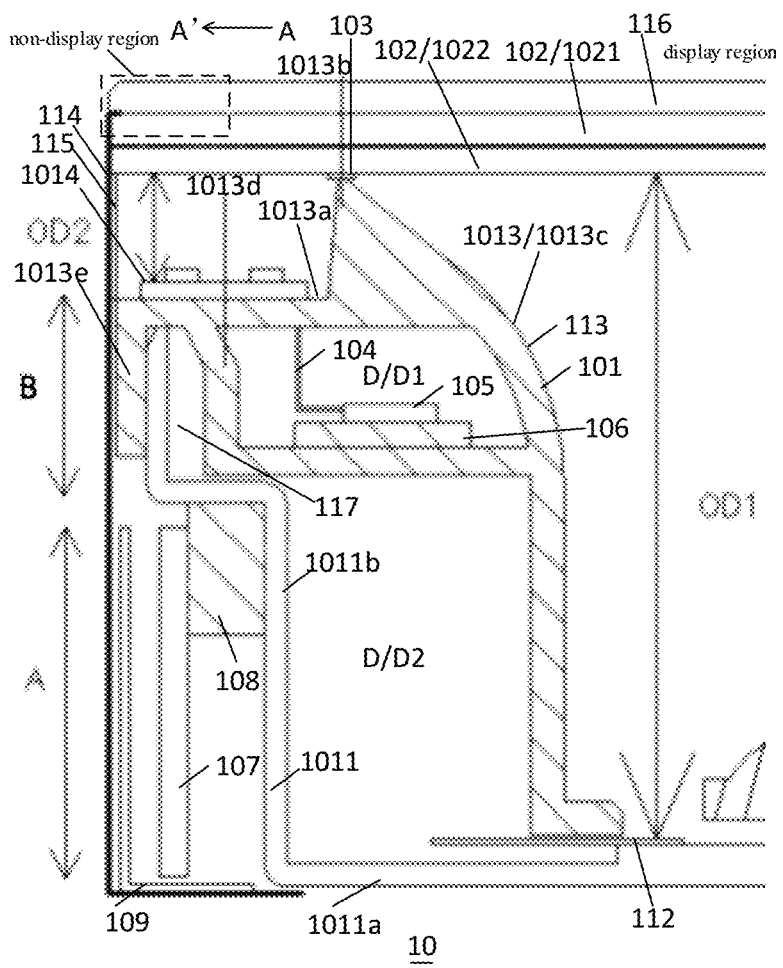
FIG. 3 is a schematic diagram of a cross-sectional structure of still another display module provided by at least one embodiment of the present disclosure.

For example, FIG. 3 is a schematic diagram of a cross-sectional structure of still another display module provided by at least one embodiment of the present disclosure. As shown in FIG. 3, a signal line 104, a connector 105 and a driving board 106 are disposed in the first sub-accommodating space D1, a first end of the signal line 104 is electrically connected to the second light source 1014, a second end of the signal line 104 is electrically connected to the driving board 106 through the connector 105, and the driving board 106 is configured to provide a turn-on voltage to the second light source 1014.

For example, as shown in FIG. 3, the display module 10 further includes a flexible circuit board 107, a supporting foam 108, and a flexible circuit protective board 109 which are all disposed on the side of the side plate 1011b away from the second sub-accommodating space D2, and the flexible circuit board 107 is connected to the display panel 102 and configured to drive the display panel 102 for display.

For example, as shown in FIG. 3, the light-emitting height of the first light source 1012 is OD1, and the value range of OD1 is from 25 mm to 35 mm, for example, 25 mm, 28 mm, 30 mm, 32 mm or 35 mm; the light-emitting height of the second light source 1014 is OD2, and the value range of OD2 is from 5 mm to 10 mm, for example, the value of the light-emitting height OD2 of the second light source 1014 may be 5 mm, 6 mm, 8 mm or 10 mm. The space height of B is a part of the middle frame 1013, a part of the back plate 1011 and the locking and fixing region of the flexible circuit protective board 109, for example, the value range of B is from 6 mm to 10 mm, for example, the value of B is 6 mm, 7 mm, 8 mm, 9 mm or 10 mm; and the space height of A is the space region where the flexible circuit board 107 is placed, and the value of A is 15 mm, 16 mm, 17 mm, 18 mm, 19 mm or 20 mm.

For example, as shown in FIG. 1, FIG. 2 and FIG. 3, the middle frame 1013 further includes a second supporting portion 1013e, the second supporting portion 1013e is in a shape of a long strip, a first end of the second supporting portion 1013e is connected to the first bearing portion 1013a, and a side wall of the second supporting portion 1013e is laminated to a side wall of the side plate 1011b to support the side plate 1011b.

For example, as shown in FIG. 1, FIG. 2 and FIG. 3, a second end of the second supporting portion 1013e is in a suspended state.

For example, as shown in FIG. 1, FIG. 2 and FIG. 3, the surface of the middle frame 1013 in contact with the bottom plate 1011a of the back plate 1011 is parallel to a main surface of the bottom plate 1011a, thereby enabling the middle frame 1013 to be fully laminated to the bottom plate 1011a, which in turn enables the middle frame 1013 to be stably fixed on the bottom plate 1011a.

For example, as shown in FIG. 1, FIG. 2 and FIG. 3, the display panel 102 includes a liquid crystal cell 1021 and a diffuser plate 1022 (e.g., a glass diffuser plate) disposed on a side of the liquid crystal cell 1021 close to the backlight module 101, and the second bearing portion 1013b and the glass diffuser plate are laminated together by the adhesive 103. For example, the adhesive 103 may be UV-curable adhesive, hot-melt adhesive, or glue formed by combining UV-curable adhesive and hot-melt adhesive. The light emitted by the first light source 1012 and the second light source 1014 can be transmitted to the liquid crystal cell 1021 through the adhesive 103.

Figure 4:
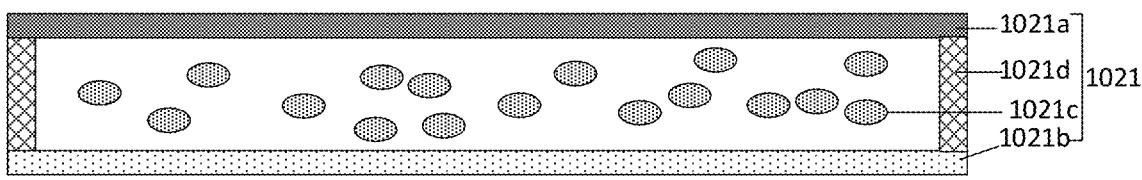
FIG. 4 is a schematic diagram of a cross-sectional structure of a liquid crystal cell provided by at least one embodiment of the present disclosure.

For example, FIG. 4 is a schematic diagram of a cross-sectional structure of a liquid crystal cell provided by at least one embodiment of the present disclosure. The liquid crystal cell 1021 includes a first substrate 1021a and a second substrate 1021b facing and spaced apart from each other, and a liquid crystal layer 1021c between the first substrate 1021a and the second substrate 1021b. Although not shown, a plurality of gate lines and a plurality of data lines are formed on the inner surface of the first substrate (e.g., an array substrate) 1021a. The plurality of gate lines and the plurality of data lines cross each other to define a plurality of pixel regions, and thin film transistors (TFTs) are connected to both the gate lines and the data lines. A transparent pixel electrode in each of the pixel regions is electrically connected to a source electrode or a drain electrode of a thin film transistor. In addition, a black matrix covering the gate lines, the data lines, and the thin film transistors is formed on the inner surface of the second substrate (e.g., a color filter substrate) 1021b, and a color filter layer including a red color filter, a green color filter, and a blue color filter is formed on the black matrix, for example, a transparent common electrode is formed on the color filter layer.

As shown in FIG. 4, a first alignment layer (not shown in FIG. 4) is formed between the first substrate 1021a and the liquid crystal layer 1021c, and a second alignment layer (not shown in FIG. 4) is formed between the second substrate 1021b and the liquid crystal layer 1021c. In addition, a sealing pattern 1021d is formed in an edge portion between the first substrate 1021a and the second substrate 1021b. The sealing pattern 1021d is, for example, a frame sealant pattern to prevent leakage of the liquid crystal layer. For example, the sealing pattern 1021d is not limited to a heat-curable sealant or an UV-curable sealant. An accommodating space is formed between the sealing pattern 1021d and the first substrate 1021a as well as the second substrate 1021b, and the liquid crystal layer 1021c is disposed in the accommodating space.

For example, a first polarizer (not shown in FIG. 4) and a second polarizer (not shown in FIG. 4) may also be formed on the outer surfaces of the first substrate 1021a and the second substrate 1021b, respectively, and the embodiments of the present disclosure are not limited thereto.

For example, the materials of the first substrate 1021a and the second substrate 1021b may include glass, plastic or other light-transmitting materials, and the materials of the first substrate 1021a and the second substrate 1021b may be the same or different.

It should be noted that, in the structure shown in FIG. 4, the liquid crystal display panel is formed by using the liquid crystal layer 1021c as a display medium. In the embodiments of the present disclosure, the display medium may also be an organic electroluminescent material or an electrophoretic material, which are not limited in the embodiments of the present disclosure.

Figure 5:
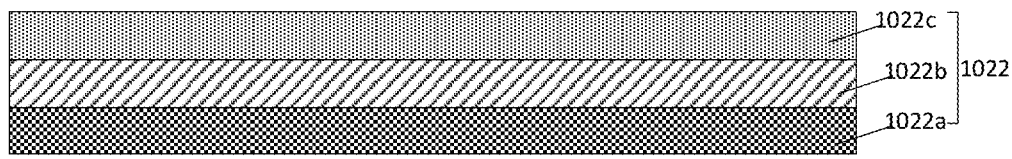
FIG. 5 is a schematic diagram of a cross-sectional structure of a diffuser plate provided by at least one embodiment of the present disclosure.

For example, the diffuser plate 1022 may also be other types of diffuser plates other than the glass diffuser plate. For example, FIG. 5 is a schematic diagram of a cross-sectional structure of a diffuser plate provided by at least one embodiment of the present disclosure. As shown in FIG. 5, the diffuser plate includes a diffuser sheet 1022a, a prism sheet 1022b, a light enhancement sheet 1022c or other optical composite film materials. The diffuser sheet 1022a, the prism sheet 1022b and the light enhancement sheet 1022c may be sequentially laminated and formed on a transparent substrate. The transparent substrate needs to have certain strength and resistance to thermal expansion and contraction. For example, the transparent substrate may be a glass substrate. It should be understood that, in other exemplary embodiments, the diffuser plate 1022 may also be other structures, for example, the diffuser sheet 1022a, the prism sheet 1022b and the brightness enhancement sheet 1022c may be laminated in other order, or, in an example, the diffuser plate 1022 only includes the diffuser sheet 1022a, the prism sheet 1022b, etc., which all belong to the protection scope of the embodiments of the present disclosure.

For example, as shown in FIG. 1, FIG. 2 and FIG. 3, the display module 10 further includes a reflective film 112 disposed on the bottom plate 1011 a, and the reflective film 112 is at least partially disposed between the bottom plate 1011a and a bottom surface of the middle frame 1013, and the reflective film 112 is in contact with both the bottom plate 1011a and the bottom surface of the middle frame 1013.

For example, as shown in FIG. 1, FIG. 2 and FIG. 3, the side of the middle frame 1013 close to the first light source 1012 has an arc-shaped surface protruding toward a side of the first light source 1012, an optical film layer 113 is disposed on the arc-shaped surface, and the optical film layer 113 is configured to guide a light emitted by the first light source 1012 and irradiated on the optical film layer 113 to the display panel 102. For example, the arc-shaped surface protruding toward a side of the first light source 1012 is more conducive to the conduction of light.

It should be noted that, because the optical film layer 113 has a certain lateral light guiding property, in the case where the outer contour dimension of the optical film layer 113 and the arc-shaped surface of the middle frame 1013 do not completely match, and there is a small error, that is, the optical film layer 113 is not completely attached to the arc-shaped surface of the middle frame 1013, the optical film layer 113 may still achieve the function of guiding light.

For example, disposing the optical film layer 113 on the arc-shaped surface of the middle frame 1013 can prevent the arc-shaped surface of the middle frame 1013 from absorbing the light emitted by the first light source, thereby preventing the edge of the display module from being darkened. A specific embodiment of disposing the optical film layer 113 on the arc-shaped surface of the middle frame 1013 may be to coat a layer of white paint on the arc-shaped surface of the middle frame 1013. There may also be more implementations for disposing the optical film layer 113 on the arc-shaped surface of the middle frame 1013, for example, evaporating a reflective metal layer on the arc-shaped surface of the middle frame 1013, which all belong to the protection scope of the embodiments of the present disclosure.

For example, the optical film layer 113 may be connected to the display panel 102 through a transparent adhesive layer (not shown in FIG. 1, FIG. 2 and FIG. 3). The transparent adhesive layer has strong light transmittance, and the light from a light-emitting side of the optical film layer 113 can be transmitted to the display panel 102 through the transparent adhesive layer, so as to avoid the problem of poor display effect caused by the dark frame of the display panel 102. For example, the transparent adhesive layer may be UV-curable adhesive, hot-melt adhesive, or glue formed by combining UV-curable adhesive and hot-melt adhesive.

For example, as shown in FIG. 1, FIG. 2 and FIG. 3, the display module 10 further includes a light-shielding tape 114, and the light-shielding tape 114 is connected to a side surface of the display panel 102, a side surface of the first bearing portion 1013a, and a surface of the bottom plate 1011a away from the display panel 102. For example, in the overall structure of the display module 10, the display module 10 includes a protective shell disposed on each edge of the backlight module 101, and the protective shell may include an adhesive frame portion (not shown in the figures) and an adhesive tape portion (i.e., the light-shielding tape 114). The adhesive frame portion is connected to the bottom plate 1011a of the back plate 1011, and the light-shielding tape 114 is connected between the middle frame 1013 and the adhesive frame portion and covers a part of surface of the side of the display panel 102 away from the backlight module 101, and a part of the surface of the back plate 1011. In addition, the side surfaces of the display module 10 can be wrapped with sealing tape to seal the display module 10.

For example, the light-shielding tape 114 is integrally sealed to prevent light leakage.

For example, the light-shielding tape 114 can not only protect the display panel 102, the first bearing portion 1013a, the bottom plate 1011a that are connected to the light-shielding tape 114, but also enable each of the display modules to be spliced when a splicing screen is subsequently formed.

For example, as shown in FIG. 1, FIG. 2 and FIG. 3, the display module 10 further includes a reflective layer 115 disposed between the light-shielding tape 114 and the second light source 1014, and the reflective layer 115 is laminated to the light-shielding tape 114. The reflective layer 115 can reflect the light emitted by the second light source 1014 to the edge region, so that more light emitted from the second light source 1014 is directed toward the display panel 102, thereby improving the utilization rate of the light emitted by the second light source 1014.

For example, as shown in FIG. 1, FIG. 2 and FIG. 3, the display module 10 further includes a glass plate 116 disposed on the side of the display panel 102 away from the backlight module 101, the edge of the glass plate 116 has an arc-shaped portion to form a 2.5D glass, and the 2.5D glass refracts the light emitted by the backlight source to achieve the effect of magnifying the image. The 2.5D glass can be used in the display module for seamless display.

Figure 6:
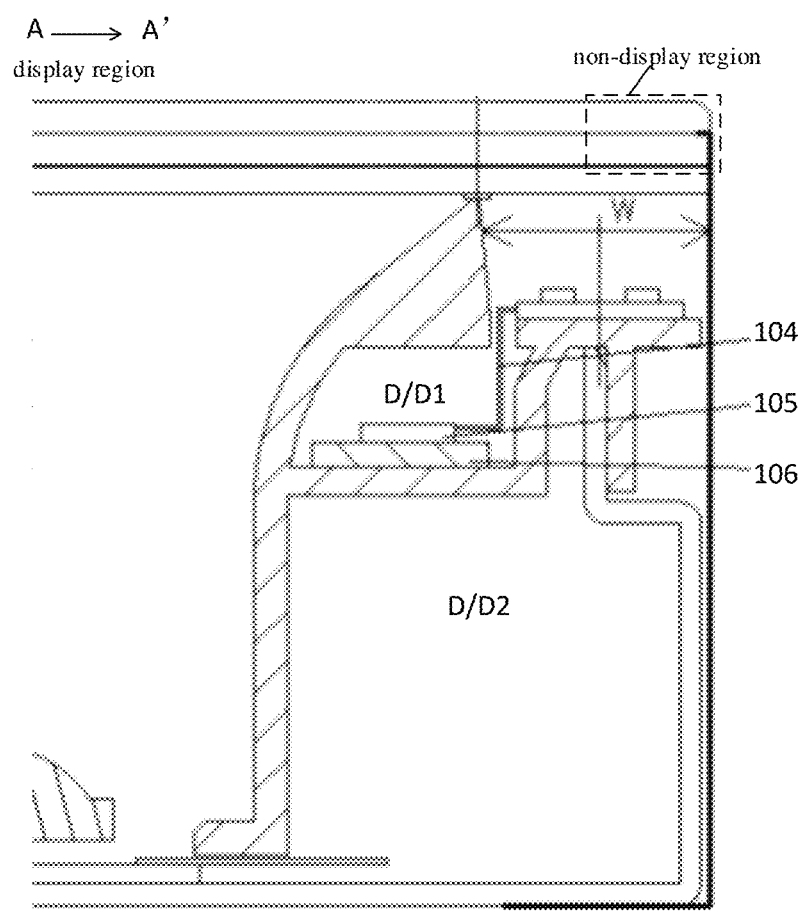
FIG. 6 is a schematic diagram of a cross-sectional structure of still another display module provided by at least one embodiment of the present disclosure.

For example, FIG. 6 is a schematic diagram of a cross-sectional structure of still another display module provided by at least one embodiment of the present disclosure. The cross-sectional structure of the display module shown in FIG. 6 is symmetrically disposed with the cross-sectional structure of the display module shown in FIG. 3, As shown in FIG. 6, a signal line 104, a connector 105 and a driving board 106 are disposed in the first sub-accommodating space D1, a first end of the signal line 104 is electrically connected to the second light source 1014, a second end of the signal line 104 is electrically connected to the driving board 106 through the connector 105, and the driving board 106 is configured to provide a turn-on voltage to the second light source 1014. The difference from FIG. 3 is that the second sub-accommodating space D2 of the display module 10 is not provided with a flexible circuit board, a supporting foam and a flexible circuit protective board.

For example, referring to FIG. 1 and FIG. 6, the width W of the first bearing portion 1013a is from 10 mm to 20 mm, for example, the width W of the first bearing portion 1013a is 10 mm, 12 mm, 14 mm, 16 mm, 18 mm or 20 mm, so as to ensure the support strength of the display panel and save the manufacturing cost of the second light source on the first bearing portion 1013a.

For example, for other structures in FIG. 6 can refer to the related descriptions in FIG. 3 mentioned above, which will not be repeated here.

Figure 7:
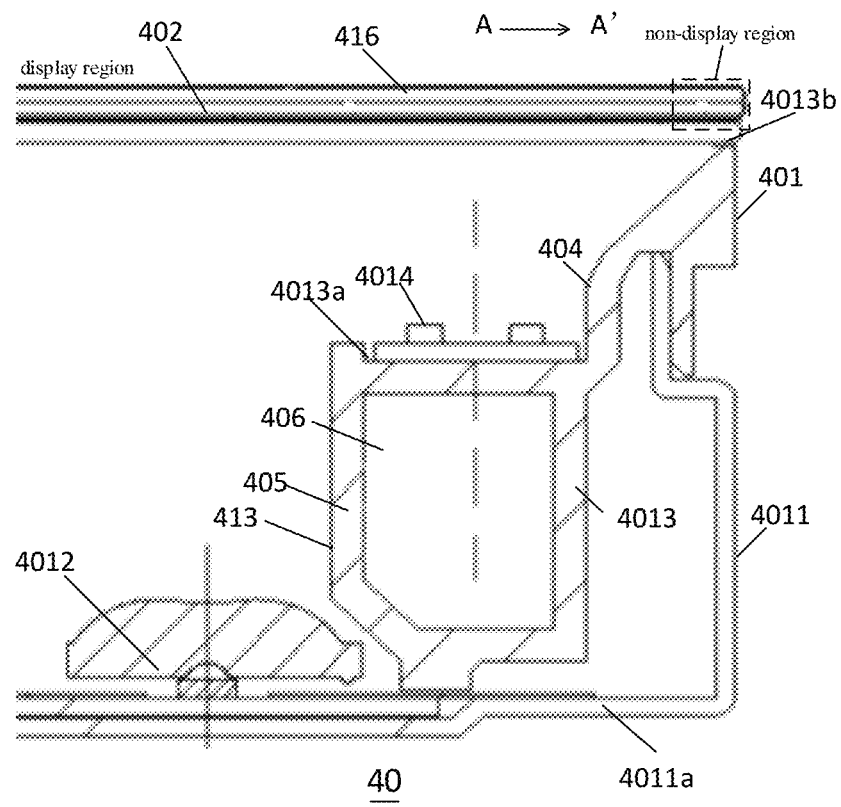
FIG. 7 is a schematic diagram of a cross-sectional structure of still another display module provided by at least one embodiment of the present disclosure.

For example, FIG. 7 is a schematic diagram of a cross-sectional structure of still another display module provided by at least one embodiment of the present disclosure. As shown in FIG. 7, the display module 40 includes a backlight module 401 and a display panel 402, and the backlight module 401 includes a back plate 4011, a first light source 4012 and a middle frame 4013. The back plate 4011 includes a bottom plate 4011a, the first light source 4012 is disposed on the bottom plate 4011a, and the middle frame 4013 is disposed between the bottom plate 4011a and the display panel 402. A side of the middle frame 4013 close to the display panel 402 includes a first bearing portion 4013a and a second bearing portion 4013b, the first bearing portion 4013a is in a display region of the middle frame 4013, and a second light source 4014 is disposed on the first bearing portion 4013a. The second bearing portion 4013b is on a side of the first bearing portion 4013a close to a peripheral region of the display panel 402, and the second bearing portion 4013b is connected to a position of the display panel 402 corresponding to an edge. The width of the second bearing portion 4013b is set to be very narrow, and at least two second light sources 4014 are disposed in the display region, which can reduce or eliminate the problem of the edge pixel picture being dark.

For example, as shown in FIG. 7, the middle frame 4013 includes an arc-shaped portion 404 connected to an end portion of the first bearing portion 4013a, the arc-shaped portion 404 protrudes toward a side close to the first bearing portion 4013a, and the second bearing portion 4013b is disposed at an end portion of a side of the arc-shaped portion 404. A first supporting portion 405 is disposed between the first bearing portion 4013a and the arc-shaped portion 404, a first end of the first supporting portion 405 is connected with a surface of the first bearing portion 4013a, a second end of the first supporting portion 405 is connected with a surface of the arc-shaped portion 404 to form a first sub-accommodating space 406, and a circuit board and the like may be placed in the first sub-accommodating space 406.

For example, as shown in FIG. 7, the first supporting portion 405 has a corner shape, so that the first supporting portion 405 can support the first bearing portion 4013a and the arc-shaped portion 404.

For example, as shown in FIG. 7, an optical film layer 413 is disposed on the surface of the first supporting portion 405 close to the first light source 4012, and the optical film layer 413 is configured to guide a light emitted by the first light source 4012 and irradiated on the optical film layer 4012 to the display panel 402. For example, the arc-shaped surface protruding toward a side of the first light source 4012 is more conducive to the conduction of light.

For example, disposing the optical film layer 413 on the surface of the first supporting portion 405 close to the first light source 4012 can prevent the first supporting portion 405 from absorbing the light emitted by the first light source 4012, thereby preventing the edge of the display module from being darkened. A specific embodiment of disposing the optical film layer 413 on the surface of the first supporting portion 405 close to the first light source 4012 may be to coat a layer of white paint on the surface of the first supporting portion 405 close to the first light source 4012. There may also be more implementations for disposing the optical film layer 113 on the surface of the first supporting portion 405 close to the first light source 4012, for example, evaporating a reflective metal layer on the surface of the first supporting portion 405 close to the first light source 4012, which all belong to the protection scope of the embodiments of the present disclosure.

For example, as shown in FIG. 7, the display module 40 further includes a glass plate 416 disposed on the side of the display panel 402 away from the backlight module 401, the edge of the glass plate 416 has an arc-shaped portion to form a 2.5D glass, and the 2.5D glass refracts the light emitted by the backlight source to achieve the effect of magnifying the image. The 2.5D glass can be used in the display module for seamless display.

For example, the relevant features of the first light source 4012 and the second light source 4014 can refer to the relevant descriptions mentioned above, which will not be repeated here.

For example, the width of the second bearing portion 4013b is smaller than the width of the first bearing portion 4013a. For example, as shown in FIG. 7, the width of the second bearing portion 4013b is 1%~10% of the width of the first bearing portion 4013a. For example, the width of the second bearing portion 4013b is 1%, 2%, 4%, 6%, 8%, or 10% of the width of the first bearing portion 4013a.

It should be noted that the width of the first bearing portion 4013a and the width of the second bearing portion 4013b are respectively the width of the first bearing portion 4013a and the width of the second bearing portion 4013b in the direction A-A' from the display region to the non-display region in FIG. 7.

Figure 8:
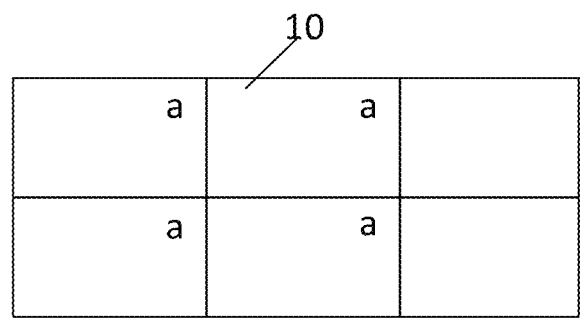
FIG. 8 is a schematic diagram of a planar structure of a display device provided by at least one embodiment of the present disclosure.

For example, FIG. 8 is a schematic diagram of a planar structure of a display device provided by at least one embodiment of the present disclosure. As shown in FIG. 8, the display device 20 includes a plurality of splicing screens formed by the display modules 10 or 40 provided by any one of the above-mentioned embodiments. For example, although FIG. 8 shows that the display device 20 includes a spliced screen formed by splicing six display modules 10, the embodiments of the present disclosure are not limited thereto. The display device may also include more display modules 10, for example, 2, 4, 9 and so on. A plurality of display modules 10 are spliced with each other, and a splicing seam a is formed between any two adjacent display modules 10. In some examples, the display module 10 may be a liquid crystal display module, an organic light-emitting diode (OLED) display module or an electrophoretic display module. At least a second light source 1014 is disposed adjacent to the splicing seam a. Adjacent to the splicing seam refers to the range within a length of about 1 cm from the splicing seam a, which can be determined according to the size of the display device 20. Referring to FIG. 8 and FIG. 3, the second light source 1014 may be a light-emitting diode (LED), a light bar composed of a plurality of light-emitting diodes, or other components capable of emitting light, such as an organic light-emitting diode (OLED). In the embodiments of the present disclosure, the second light source 1014 take the light bars arranged in a straight line as an example, and each of the display modules 10 is provided with the second light source 1014 adjacent to the splicing seam a.

For example, the display device 20 includes any one of the above-mentioned display modules, and the display device in the embodiments of the present disclosure may be any product or component with display function such as a display, an electronic paper, a mobile phone, a tablet computer, a notebook computer, a digital photo frame, a navigator and so on.

Figure 9:
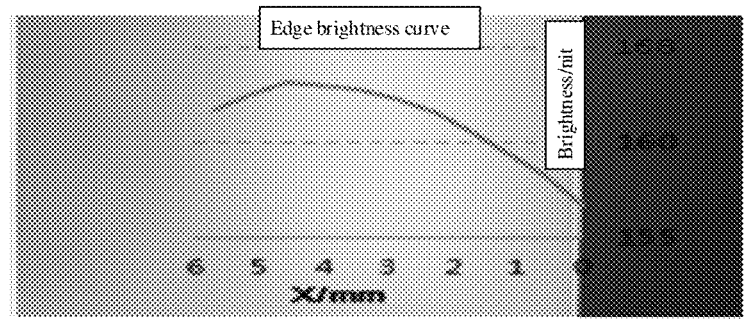
FIG. 9 is a graph of luminance curve displayed by a display device provided by at least one embodiment of the present disclosure.

For example, FIG. 9 is a graph of luminance curve displayed by a display device provided by at least one embodiment of the present disclosure. As shown in FIG. 9, the abscissa is the distance to the edge of the display device, and the ordinate is the brightness of the edge of the display device corresponding to different abscissas. As can be seen from FIG. 9, in the case where the distance from the edge of the display device is 4.5 mm, the maximum brightness of the display device is 167 nit. Through the edge brightness curve test, it can be concluded that the uniformity of the edge brightness of the display device provided by the embodiment of the present disclosure can reach 95%.

At least one embodiment of the present disclosure further provides a middle frame, the middle frame includes a first bearing portion and an arc-shaped portion connected to an end portion of the first bearing portion. The arc-shaped portion protrudes toward a side away from the first bearing portion, and a second bearing portion is disposed on an end portion of a side of the arc-shaped portion. A first supporting portion is disposed between the first bearing portion and the arc-shaped portion, a first end of the first supporting portion is connected to a surface of the first bearing portion opposite to a bearing surface, and a second end of the first supporting portion is connected to a surface of the arc-shaped portion to form a first sub-accommodating space. The structure of the middle frame is simple, and the cost is low, and the use of the middle frame in the display module can avoid the phenomenon of poor dark frame.

Figure 10:
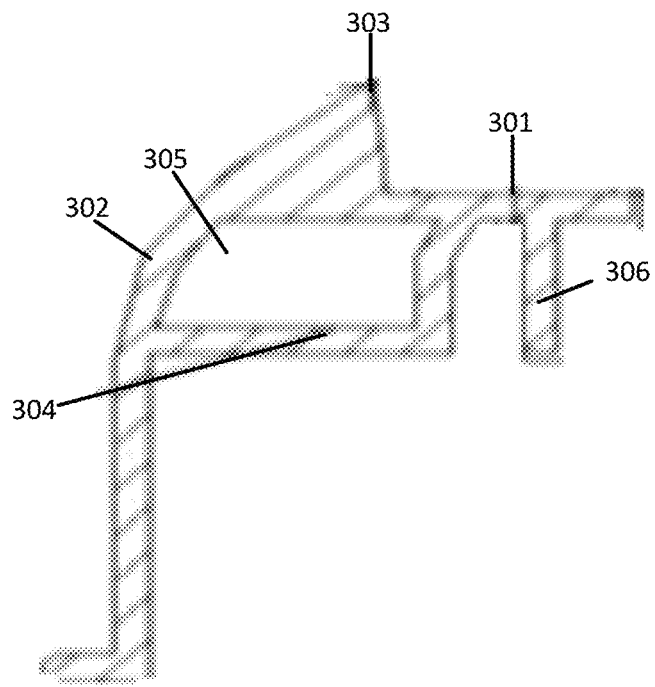
FIG. 10 is a schematic diagram of a cross-sectional structure of a middle frame provided by at least one embodiment of the present disclosure.

For example, FIG. 10 is a schematic diagram of a cross-sectional structure of a middle frame provided by at least one embodiment of the present disclosure. As shown in FIG. 10, the middle frame 30 includes a first bearing portion 301 and an arc-shaped portion 302 connected to an end portion of the first bearing portion 301. The arc-shaped portion 302 protrudes toward a side away from the first bearing portion 301, and a second bearing portion 303 is disposed on an end portion of a side of the arc-shaped portion 302. A first supporting portion 304 is disposed between the first bearing portion 301 and the arc-shaped portion 302, a first end of the first supporting portion 304 is connected to a surface of the first bearing portion 301 opposite to a bearing surface, and a second end of the first supporting portion 304 is connected to a surface of the arc-shaped portion 302 to form a first sub-accommodating space 305. The first supporting portion 304 can support the first bearing portion 301 and the arc-shaped portion 302.

It should be noted that, the bearing surface of the first bearing portion 301 refers to the surface of the first bearing portion 301 that is used for bearing light source in subsequent, or a surface that is closer to the display panel.

For example, the structure of the middle frame 30 shown in FIG. 10 is simple and the manufacturing cost is low, and the use of the middle frame 30 in the display module can avoid the phenomenon of poor dark frame.

For example, as shown in FIG. 10, the first supporting portion 304 is in an "L" shape, so that the first supporting portion 304 can support the first bearing portion 301 and the arc-shaped portion 302. It should be noted that, the first support portion 304 may also have other shapes such as zigzag, which are not limited in the embodiments of the present disclosure.

For example, as shown in FIG. 10, a second supporting portion 306 is disposed on the side of the first sub-accommodating space 305 away from the arc-shaped portion 302, and the second supporting portion 306 is in a shape of a long strip. A first end of the second supporting portion 306 is connected to the first bearing portion 301.

For example, as shown in FIG. 10, a second end of the second supporting portion 306 is in a suspended state.

For example, the other structures in the middle frame 30 can refer to the above-mentioned related descriptions of the display module, which will not be repeated here.

Figure 11:
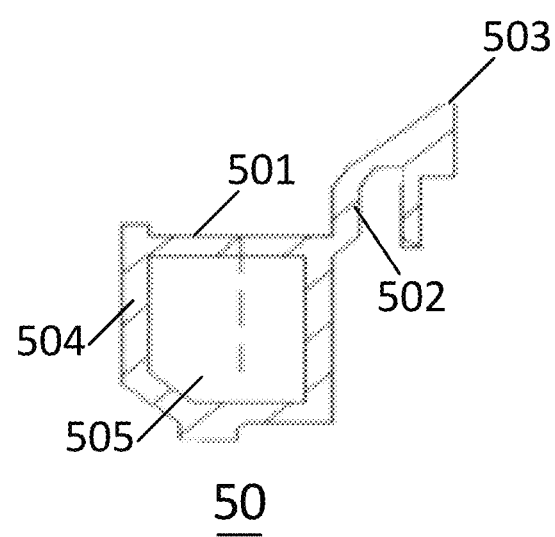
FIG. 11 is a schematic diagram of a cross-sectional structure of another middle frame provided by at least one embodiment of the present disclosure.

For example, FIG. 11 is a schematic diagram of a cross-sectional structure of another middle frame provided by at least one embodiment of the present disclosure. As shown in FIG. 11, the middle frame 50 includes a first bearing portion 501 and an arc-shaped portion 502 connected to an end portion of the first bearing portion 501. The arc-shaped portion 502 protrudes to a side close to the first bearing portion 501, and a second bearing portion 503 is disposed on an end portion of a side of the arc-shaped portion 502. A first supporting portion 504 is disposed between the first bearing portion 501 and the arc-shaped portion 502, a first end of the first supporting portion 504 is connected to a surface of the first bearing portion 501 opposite to a bearing surface, and a second end of the first supporting portion 504 is connected to a surface of the arc-shaped portion 502 to form a first sub-accommodating space 505.

For example, as shown in FIG. 11, the first supporting portion 504 has a corner shape, so that the first supporting portion 504 can support the first bearing portion 501 and the arc-shaped portion 502.

For example, as shown in FIG. 11, the width of the second bearing portion 503 is smaller than the width of the first bearing portion 501. The width of the second bearing portion 503 is 1%~10% of the width of the first bearing portion 501. For example, the width of the second bearing portion 503 is 1%, 2%, 4%, 6%, 8%, or 10% of the width of the first bearing portion 501.

In the overall structure, the middle frame 50 is disposed in a whole circle, and the first sub-accommodating space 505 is correspondingly formed into a hollow straight cylindrical shape.

The display module and the middle frame provided by at least one embodiment of the present disclosure have at least one of the following beneficial technical effects:

(1) In the display module provided by at least one embodiment of the present disclosure, the first bearing portion is disposed at the edge of the middle frame, the second light source is disposed on the first bearing portion, and the second bearing portion is connected to the position of the display panel corresponding to the display region, so as to solve the problem that the edge pixel picture of the narrow frame splicing screen is darkened due to the poor transmittance of the adhesive and the assembly process error, thereby improving the brightness of the edge pixels of the display module.

(2) In the display module provided by at least one embodiment of the present disclosure, the glass plate is disposed on the side of the display panel away from the backlight module, and the edge of the glass plate has the arc-shaped portion to form the 2.5D glass, the 2.5D glass refracts the light emitted by the backlight source to achieve the effect of magnifying the image, and the 2.5D glass can be used in the display module for seamless display.

The following statements should be noted:

(1) The drawings involve only the structure(s) in connection with the embodiment(s) of the present disclosure, and other structure(s) can be referred to common design(s).

(2) For the sake of clarity, in the drawings used to describe the embodiments of the present disclosure, the thickness of the layer or the region is enlarged or reduced, i.e., these drawings are not drawn to the actual scale.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display module, comprising a backlight module and a display panel, wherein the backlight module comprises:
    a back plate, comprising a bottom plate;
    a first light source, disposed on the bottom plate; and
    a middle frame, disposed between the bottom plate and the display panel, wherein a side of the middle frame close to the display panel comprises a first bearing portion and a second bearing portion, the first bearing portion is at an edge of the middle frame, and a second light source is disposed on the first bearing portion; and the second bearing portion is on a side of the first bearing portion close to a display region of the display panel, and the second bearing portion is connected to a position of the display panel corresponding to the display region;

the middle frame comprises an arc-shaped portion protruding toward the first light source, an optical film layer is disposed on a surface of the arc-shaped portion close to the first light source, and the optical film layer is configured to guide light emitted by the first light source and irradiated on the optical film layer to the display panel.

2. The display module according to claim 1, further comprising a light board disposed on the first bearing portion, wherein the second light source comprises a plurality of light-emitting diodes disposed on the light board.

3. The display module according to claim 2, wherein in a direction from the display region to a non-display region, at least two light-emitting diodes are disposed on the light board.

4. The display module according to claim 1, further comprising a light guide plate disposed on the first bearing portion, wherein the second light source comprises a light bar disposed on a side wall of the first bearing portion.

5. The display module according to claim 1, wherein a width of the second bearing portion is smaller than a width of the first bearing portion.

6. The display module according to claim 5, wherein the width of the second bearing portion is 1%~10% of the width of the first bearing portion.

7. The display module according to claim 1, wherein an accommodating space between the arc-shaped portion and a side plate of the back plate as well as the bottom plate of the back plate, and a first supporting portion;
the first supporting portion is disposed in the accommodating space, and the first supporting portion is in an "L" shape; and
a first end of the first supporting portion is connected to a surface of the first bearing portion close to the bottom plate, and a second end of the first supporting portion is connected to a surface of the arc-shaped portion close to the side plate.

8. The display module according to claim 7, wherein a gap is formed between the first supporting portion and the side plate.

9. The display module according to claim 7, wherein the first supporting portion divides the accommodating space into a first sub-accommodating space and a second sub-accommodating space, and a volume of the first sub-accommodating space is smaller than a volume of the second sub-accommodating space.

10. The display module according to claim 9, wherein a signal line, a connector and a driving board are disposed in the first sub-accommodating space, a first end of the signal line is electrically connected to the second light source, a second end of the signal line is electrically connected to the driving board through the connector, and the driving board is configured to provide a turn-on voltage to the second light source.

11. The display module according to claim 9, further comprising a flexible circuit board, a supporting foam, and a flexible circuit protective board which are all disposed on a side of the side plate away from the second sub-accommodating space, and the flexible circuit board is connected to the display panel and configured to drive the display panel for display.

12. The display module according to claim 7, wherein the middle frame further comprises a second supporting portion, the second supporting portion is in a shape of a strip, a first end of the second supporting portion is connected to the first bearing portion, and a side wall of the second supporting portion is laminated to a side wall of the side plate.

13. The display module according to claim 1, wherein the display panel comprises a liquid crystal cell and a glass diffuser plate disposed on a side of the liquid crystal cell close to the backlight module, and the second bearing portion and the glass diffuser plate are laminated together by an adhesive.

14. The display module according to claim 1, further comprising a reflective film disposed on the bottom plate, and the reflective film is at least partially disposed between the bottom plate and a bottom surface of the middle frame, and the reflective film is in contact with both the bottom plate and the bottom surface of the middle frame.

15. The display module according to claim 1, further comprising a light-shielding tape, wherein the light-shielding tape is connected to a side surface of the display panel, a side surface of the first bearing portion, and a surface of the bottom plate away from the display panel.

16. The display module according to claim 15, further comprising a reflective layer disposed between the light-shielding tape and the second light source, and the reflective layer is laminated to the light-shielding tape.

17. The display module according to claim 1, further comprising a glass plate disposed on a side of the display panel away from the backlight module, wherein an edge of the glass plate comprises an arc-shaped portion.

18. A middle frame, comprising a first bearing portion and an arc-shaped portion connected to an end portion of the first bearing portion, wherein
the arc-shaped portion protrudes toward a side away from the first bearing portion, and a second bearing portion is disposed on an end portion of a side of the arc-shaped portion; and
a first supporting portion is disposed between the first bearing portion and the arc-shaped portion, a first end of the first supporting portion is connected to a surface of the first bearing portion opposite to a bearing surface, and a second end of the first supporting portion is connected to a surface of the arc-shaped portion to form a first sub-accommodating space;
an optical film layer is disposed on a surface of the arc-shaped portion close to the first light source.

19. The middle frame according to claim 18, wherein a second supporting portion is disposed on a side of the first sub-accommodating space away from the arc-shaped portion, the second supporting portion is in a shape of a strip, and a first end of the second supporting portion is connected to the first bearing portion.

* * * * *